United States Patent
Iseli et al.

(10) Patent No.: US 11,550,291 B2
(45) Date of Patent: Jan. 10, 2023

(54) ADVANCED THERMAL COMPENSATION OF MECHANICAL PROCESSES

(71) Applicant: HEXAGON TECHNOLOGY CENTER GMBH, Heerbrugg (CH)

(72) Inventors: Claudio Iseli, Au (CH); Bernd Reimann, Heerbrugg (CH); Michael Schlenkrich-Erasmus, Baldham (DE); Jürgen Schneider, Linden (DE); Katrin Mentl, Marbach (CH); Roland Burgstaller, Höchst (AT); Frank Lamping, Lahnau (DE); Alexandre Heili, Alstätten (CH); Asif Rana, Heerbrugg (CH); Beat Aebischer, Heerbrugg (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 133 days.

(21) Appl. No.: 17/112,836

(22) Filed: Dec. 4, 2020

(65) Prior Publication Data

US 2021/0191359 A1 Jun. 24, 2021

(30) Foreign Application Priority Data

Dec. 20, 2019 (EP) ..................................... 19218989

(51) Int. Cl.
G05B 19/404 (2006.01)
(52) U.S. Cl.
CPC .. G05B 19/404 (2013.01); *G05B 2219/35015* (2013.01)
(58) Field of Classification Search
None
See application file for complete search history.

(56) References Cited

U.S. PATENT DOCUMENTS

| 6,804,600 | B1 | 10/2004 | Uluyol | |
|---|---|---|---|---|
| 9,702,681 | B2 * | 7/2017 | Chang | .................. G01B 5/0014 |
| 10,466,029 | B2 * | 11/2019 | Fuchs | .................. G01B 5/0016 |
| 2013/0028673 | A1 * | 1/2013 | Onishi | .................. B23Q 15/18 |
| | | | | 408/8 |
| 2019/0033820 | A1 * | 1/2019 | Zhi | .................... B23Q 11/0007 |
| 2019/0354892 | A1 * | 11/2019 | Hagihara | ............. G06N 3/0454 |

FOREIGN PATENT DOCUMENTS

| CN | 107607070 A | * | 1/2018 |
|---|---|---|---|
| CN | 109813225 A | | 5/2019 |
| EP | 2239441 A2 | | 10/2010 |
| JP | 2006281420 A | * | 10/2006 |
| WO | 02/46848 A1 | | 6/2002 |

OTHER PUBLICATIONS

Extended European Search Report dated Jul. 23, 2020 as received in Application No. 19218989.2.

* cited by examiner

*Primary Examiner* — Jason Lin
(74) *Attorney, Agent, or Firm* — Maschoff Brennan

(57) ABSTRACT

A computer program product and to a method for compensating thermal errors in a mechanical process, the mechanical process in particular provided by a mechanical device such as a coordinate measuring machine, a tooling machine or an articulated robot arm. Thermal errors arise due to thermal disturbances affecting the mechanical process, wherein thermal disturbances may arise from environmental influences affecting the mechanical process or from internally generated changing temperature distributions.

15 Claims, 3 Drawing Sheets

ADVANCED THERMAL COMPENSATION OF MECHANICAL PROCESSES

CROSS-REFERENCE TO RELATED APPLICATIONS

This application claims priority to European Patent Application No. 19218989.2, filed on Dec. 20, 2019. The foregoing patent application are incorporated herein by reference.

FIELD OF THE INVENTION

The present invention relates to a computer program product and a method for numerically compensating thermal errors arising in mechanical processes.

BACKGROUND

General mechanical processes are susceptible to errors arising from thermal disturbances; such errors may be caused by thermal gradients across the mechanical process and/or by errors arising from a changed base value of temperature, for example. Depending on the exact nature of such thermal disturbances, it is difficult to predict the potentially subtle influences of the thermal disturbances on the outcome of the mechanical process. One way to mitigate such potentially detrimental influences is by way of a careful calibration of the mechanical process, wherein the calibration provides information about thermal errors for specific evolutions of the mechanical process. Different evolutions of the mechanical process which are not calibrated cannot be compensated by such a naive method.

Information about the evolution of the mechanical process can be obtained via sensors, wherein sensors are in particular embodied as thermal sensors (such as resistance temperature detectors (RTDs), thermocouples, thermistors, semiconductor sensors, infrared sensors or thermal cameras) or as mechanical sensors (such as strain gauges), attached to or integrated into the mechanical device realizing the mechanical process, or via sensors providing information from the vicinity of the mechanical device. Such sensor readings may then provide diagnostic information. The optimal number of sensors to be used as well as their location/type for providing thermal error information usable for deriving thermal error compensation values is a difficult problem in general.

Mechanical processes are to some extent related to one another, in particular if the mechanical devices realizing the mechanical processes are similar. In some cases, a large amount of data might be available for a particular mechanical process, while a scarcer supply of data might exist for a different mechanical process. Often it is desirable, however, to be able to apply equally good thermal error compensation methods for both mechanical processes.

BRIEF DESCRIPTION OF THE INVENTION

It is therefore an objective of some aspects of the present invention to provide for a computer program product and a method which can provide thermal error compensation for all possible evolutions of a mechanical process, and to provide for a method for determining the optimal number/type/location of sensors used for recording data, and to provide for a method to leverage thermal error compensation information obtained from one mechanical process and use it to improve thermal error compensation for a different mechanical process, assuming the different mechanical process is similar enough to the mechanical process from which thermal error compensation information was obtained.

These objectives are achieved by realizing at least part of the features of the independent claims. Features which further develop the invention in an alternative or advantageous manner are described in the dependent patent claims.

Some aspects of the invention relate to a computer program product for compensating errors of a mechanical process due to thermal disturbances, wherein the mechanical process is in particular provided by a coordinate measuring machine, a tooling machine or an articulated robot arm, the computer program product configured to receive as input a set of sensor input data points from a sensor input data point space, each sensor input data point comprising data from a set of sensors, wherein each sensor provides a sensor sequence of sensor values at sensor sequence times, and each sensor input data point corresponds to an evolution of the mechanical process, wherein different sensor input data points correspond to different evolutions of the mechanical process, a current sensor input data point, a set of thermal error compensation states of the mechanical process, wherein each thermal error compensation state comprises a thermal error compensation state sequence of thermal error compensation vectors, wherein the thermal error compensation vectors are provided at thermal error compensation state sequence times, a model of the mechanical process, the model comprising a set of free parameters and a set of internal parameters, the assignment of free parameters and internal parameters determining the temporal and spatial evolution of the model, the free parameters having pre-assigned values, constraints on the temporal and spatial evolution of the model in the form of possible sets of values which the free parameters can take and in the form of sets of relationships between the internal parameters of the model, an abstract representation, wherein the abstract representation is embodied as a function mapping an input space onto the space of thermal error compensation states, wherein the input space comprises at least the sensor input data point space, the function having a set of function parameters, and a representation input function with assigned function parameter values, the representation input function corresponding in form to the abstract representation, wherein the computer program product possesses two modes of operations, wherein in a training mode a training data set comprising empirical and/or synthetic training data is used, wherein the empirical training data are comprised of the set of sensor input data points as empirical training data input and the set of thermal error compensation states as empirical training data output, and wherein the synthetic training data are constructed by way of simulations carried out using the model of the mechanical process and the constraints, the synthetic training data comprising a synthetic simulated set of sensor input data points as synthetic training data input and a synthetic simulated set of thermal error compensation states as synthetic training data output, wherein the training data set comprising the empirical and/or synthetic training data is used for adapting the representation input function by adapting the function parameters, in particular through the use of an optimization method, the inference mode being configured to use the adapted representation input function, wherein the adapted representation input function is invoked with at least the current sensor input data point to calculate a current thermal error compensation state used for compensating the thermal errors arising during the execution of the mechanical process.

Free parameters are parameters which may need to be determined through a calibration step, while internal parameters constrain the possible evolution of a mechanical process.

The computer program product learns a thermal error compensation function from empirical or synthetically generated training data or from a combination of both. The learned thermal error compensation function may be used in a production environment and may provide thermal error compensation data for new executions of mechanical processes, assuming the new executions are similar enough to the executions found in the empirical or synthetically generated training data set. The constraints provided to the computer program product may be empty in case the possible evolutions of the mechanical process are not constrained by outer circumstances.

In an embodiment of the computer program product according to some aspects of the invention, at least one sensor input data point of the set of sensor input data points comprises initial state information about the corresponding mechanical process at an initial state time, and/or at least one sensor input data point of the set of sensor input data points comprises nominal information used for controlling the mechanical process, and/or the current sensor input data point comprises current thermal error compensation state sequence times, wherein the current thermal error compensation state provided by the adapted representation input function is provided at the current thermal error compensation state sequence times.

In an embodiment of the computer program product according to some aspects of the invention, the sensor sequences of sensor values used as input to the abstract representation are aligned in time, wherein corresponding sensor sequence values of a first and a second sensor sequence are obtained at the same time during the evolution of the mechanical process, the set of times at which sensor sequence values are provided being equidistant and/or event-based and/or user-triggered, and the thermal error compensation state sequence times are aligned with the sensor sequence times.

The sensors providing input to the computer program product may sample at the same times. These sampling times may be isochronal, i.e. the samples may be provided with a fixed repetition rate, or a new measurement of observables may be started due to a pre-defined external event, or a new measurement may be provided based on user input. The thermal error compensation state may be provided at the same times as the sampling times of the sensors.

In an embodiment of the computer program product according to the invention, the number of function parameters of the abstract representation is smaller than the number of free parameters and internal parameters of the model of the mechanical process.

In an embodiment of the computer program product according to the invention, the set of thermal error compensation states provided as input to the computer program product provides information about thermal error compensation only, and the synthetic simulated set of thermal error compensation states is configured to provide information about thermal error compensation only, wherein compensations for other disturbances affecting the mechanical process are substantially separable from thermal error compensation.

A sensor input data point—in case additional disturbances besides thermal disturbances affect the mechanical process—may reflect all disturbances acting on the mechanical process. For the learning of a thermal error compensation function, wherein the thermal error compensation function acts on sensor input data points, it may be beneficial if other disturbance effects in the sensor input data point are separable from thermal disturbance effects in the sensor input data point. One way to achieve this may be to change the mechanical process so that only thermal disturbances remain. This may be achieved by carefully setting the control input controlling the mechanical process: if the mechanical process is executed slowly, for example, dynamical effects due to inertia may be minimized. In case the mechanical process is not changed, the training data may be pre-compensated before being provided to the computer program product, wherein the pre-processing may numerically compensate the other disturbances affecting the training data.

In an embodiment of the computer program product according to the invention, the constraints provided to the computer program product reflect specific requirements and boundary conditions, in particular customer- or site-specific requirements and boundary conditions, the constraints limiting the space of possible evolutions of the mechanical process, wherein the constraints are reflected in the synthetic training data, the synthetic training data being generated according to the constraints, the model of the mechanical process and a set of data-generated constraints, wherein the data-generated constraints are derived from the set of sensor input data points.

Possible boundary conditions are heat flow from a factory roof heated by solar irradiation, or air flow from side walls to the top of the roof, or heat flux from neighboring machines.

In an embodiment of the computer program product according to the invention, the number of generated synthetic training data is larger than the number of function parameters of the abstract representation, wherein the synthetic training data comprise examples for evolutions of the mechanical process compatible with the constraints, the number of synthetic training data per nominal evolution compatible with a constraint being related to the expected frequency of occurrence of said nominal evolution of the mechanical process, wherein in particular the set of sensor input data points used as input to the computer program product in training mode is empty, and the training data set is only comprised of synthetic training data.

The required ratio of the number of generated synthetic training data to the number of function parameters of the abstract representation such that the function parameters of the abstract representation may be faithfully learned may depend on the structure of the abstract representation, wherein structure may refer to both the functional form of the abstract representation and to the number of parameters parametrizing the abstract representation, wherein the structure may be characterized by and/or associated with a complexity metric influencing the required amount of training data. If the abstract representation were given in the form of a polynomial of fixed degree, a sufficient ratio may lie between 10 and 1000. If the abstract representation were given in the form of a typical deep learning model, the use of regularization techniques during training may allow for the use of smaller ratios.

In an embodiment of the computer program product according to some aspects of the invention, a fixed number of sensor sequence elements is considered by the abstract representation, wherein the fixed number is the same for all sensors providing information to the computer program product, wherein the abstract representation is configured to weight the sensor sequence elements in case of temporal irregularity, temporal irregularity understood with respect to the sensor sequence times at which the sensor sequence elements were obtained, the weighting pattern taking the irregularity of the input to the abstract representation into account.

Temporal irregularity may be caused by malfunctioning sensors, for example. Another potential source of temporal irregularity may exist in distributed systems, wherein the computing unit on which the computer program product runs is placed in a different location than the mechanical device realizing the mechanical process. In such a case, sensor data may need to be provided over a network to the computer program product. Depending on the network protocol, data may be lost. An exemplary network protocol which may lose data is the user datagram protocol (UDP). Missing sensor data may also be replaced by interpolating from the sensor data.

The temporal horizon of the abstract representation may be limited, wherein only measurements provided by the sensors falling in a time window, wherein the time window may be aligned with the current time, may be used by the abstract representation. Irregularly sampled data provided by sensors, wherein irregularity refers to the time between consecutive samples, might be interpolated or weighted, for example using averaging methods within sliding temporal windows. Such sliding windows could be adaptive in the sense that the weighting scheme could take into account the nature of the mechanical process, wherein for slowly changing mechanical processes, for example, a larger weighting time window may be used than for fast changing processes where a small weighting time window might be more appropriate.

In an embodiment of the computer program product according to some aspects of the invention, the abstract representation is embodied as a recurrent neural network, or as a convolutional neural network, or as a feedforward neural network, or as ridge regression, or as random forest regression, or as polynomial of fixed degree or as an algebraic expression or elementary function.

In an embodiment of the computer program product according to the invention, the model of the mechanical process is given in the form of a finite element method, or by a combination of a numerical model with symbolic equations.

The finite element based simulation of the mechanical process may combine multiple physical models and/or may proceed in distinct steps, wherein in a first step the temporally resolved temperature distribution of the mechanical device providing the mechanical process is computed using a thermal finite element model, and in a second step the temperature distribution is used by a finite element structural description.

Some aspects of the invention relate to a method for compensating thermal errors in a mechanical process, in particular provided by a mechanical device such as a coordinate measuring machine, a tooling machine or an articulated robot arm, the method configured to use a set of sets of sensor input data points, each sensor input data point from a set of sensor input data points configured to provide information about an evolution of the mechanical process, wherein each set of sensor input data points corresponds to a set of sensors, each sensor providing sensor values in the form of a sensor sequence output at sensor sequence times, the sensor sequence outputs corresponding to a set of sensors comprised in the sensor input data point in a corresponding sensor input data point space, a set of sets of thermal error compensation states of the mechanical process, wherein each thermal error compensation state comprises a thermal error compensation state sequence of thermal error compensation vectors, wherein the thermal error compensation vectors are provided at thermal error compensation state sequence times, each set of thermal error compensation states corresponding to a set of sensor input data points from a corresponding sensor input data point space, a set of abstract representations, each abstract representation mapping from a sensor input data point space onto the corresponding space of thermal error compensation states, wherein the corresponding space of thermal error compensation states is the space comprising the set of thermal error compensation states corresponding to the set of sensor input data living in the sensor input data point space, wherein each abstract representation function has a set of function parameters, a current sensor input data point, a model of the mechanical process, the model comprising a set of free parameters and a set of internal parameters, the assignment of free parameters and internal parameters determining the temporal and spatial evolution of the model, the free parameters having pre-assigned values, and constraints on the temporal and spatial evolution of the model in the form of possible sets of values which the free parameters can take and in the form of sets of relationships between the internal parameters of the model, wherein the computer program product is invoked in the training mode with a set of sensor input data points from the set of sets of sensor input data points, each sensor input data point providing information about an evolution of the mechanical process, and the corresponding set of thermal error compensation states from the set of sets of thermal error compensation states, an abstract representation from the set of abstract representations, a representation input function with assigned function parameter values, the representation input function corresponding in form to the abstract representation, the model of the mechanical process, and the constraints as input, the computer program product providing an adapted representation input function for thermal error compensation, and the adapted representation input function is invoked in the inference mode with at least the current sensor input data point as input, wherein the computer program product provides a thermal error compensation state.

In an embodiment of the method according to some aspects of the invention, the set of sensor input data points from the set of sets of sensor input data points, the corresponding set of thermal error compensation states and the abstract representation from the set of abstract representations are chosen by a selection routine, wherein the selection routine iterates over the set of sets of sensor input data points and the set of abstract representations, invoking the computer program product in training mode with a subset of the currently considered set of sensor input data points, the corresponding subset of the corresponding set of thermal error compensation states, the currently considered abstract representation, the model of the mechanical process and the constraints, the iteration proceeding until a set of sensor input data points is found in combination with an adapted representation input function, the set of sensor input data points corresponding to a set of sensors, which provides a thermal error compensation state deviating by less than a provided threshold from the true thermal error compensation state, wherein the latter evaluation is carried out on the relative complement of the subset of the set of sensor input data points in the set of sensor input data points and the corresponding relative complement of the subset of the set of thermal error compensation states in the set of thermal error compensation states, the subsets used as input to the computer program product, wherein the relative complements form a validation data set.

In an embodiment of the method according to some aspects of the invention, the set of sets of sensor input data points is ordered according a complexity metric, wherein the ordering of the sets of sensor input data points proceeds according to the number of sensors corresponding to a set of sensor input data points, wherein the ordering proceeds in an increasing fashion, and the iteration over the set of sets of sensor input data points starts with a first set of sensor input data points and proceeds from there to sets of sensor input data points ordered above the first set according to the complexity metric.

In an embodiment of the method according to some aspects of the invention, the set of sets of sensor input data points comprises sets of sensor input data points corresponding to sets of sensors positioned at a finite number of places, the places being specified according to construction principles of the mechanical device providing the mechanical process and external influences on the mechanical process, and the cardinality of the set of sets of sensor input data points is finite.

In an embodiment of the method according to some aspects of the invention, the representation input function provided to the computer program product as input in the training mode encodes thermal error compensation information relating to a different mechanical process.

In case a thermal error compensation function is already learned for a first mechanical process and provided a second mechanical process has some structural similarity to the first mechanical process, initializing the search for a thermal error compensation function for the second mechanical process with the solution already found for the first mechanical process may provide a better initialization, thus accelerating the optimization procedure and potentially providing a better solution. Additionally, the amount of required training data from the second mechanical process may be reduced through such a transfer learning approach.

Some aspects of the invention relate to a method for providing indication about the physical sources of thermal errors in a mechanical process, the method proceeding by applying an attribution method to the adapted representation input function, wherein the attribution method provides information about input features to the adapted representation input function which have an important influence on the output of the adapted representation input function, and by using the identified important input features to provide an indication about the physical sources associated to the identified important input features, wherein the indication is in particular provided in a visual manner, wherein in particular perturbation-based attribution methods and/or backpropagation-based attribution methods are used.

Another important aspect of the provided thermal compensation models may be their explainability, i.e. their transparency to the user. For instance, it might be relevant for the user to understand which inputs to the model are the most discriminant ones with respect to the predicted target, or to know which parts of the network are primordial for specific tasks. Even in the case of black-box models like neural networks, their inner workings can be interpreted thanks to various techniques such as perturbation-based or backpropagation-based attribution methods. Typical techniques for achieving explainability are ablations, feature gradients or Shapley additive explanations, or using layer-wise relevance propagation (LRP) or DeepLIFT or integrated gradients. In ablation studies for example, certain parts of the network are removed in order to gain a better understanding of the network's behavior. Some parts of a sensor input data point may be particularly important for learning a thermal error compensation function. As the sensor input data point comprises data from sensors providing information about the mechanical process which is to be thermally compensated, identifying the important parts of the sensor input data point may help to identify critical components in the mechanical device, the critical components being particularly prone to thermal disturbances. Such an identification may proceed by tagging sensors and components of the mechanical device with unique identifiers and establishing a correspondence between their respective identifiers, a sensor and a component corresponding if the sensor records an observable associated to the component of the mechanical device. Once an important sensor is identified, the corresponding components of the mechanical device may be identified. Critical components may then be displayed graphically to a user controlling the computer program product according to the invention. This way, the computer program product may provide an indication to a user about potentially faulty components of the mechanical device.

Machine learning models could also be trained to determine the cause of thermal deformations occurring due to thermal disturbances and feed this information back to the user so he can reduce or alleviate a thermal load. Such useful insights can include inferred type and location of heat sources and their effect on measurement accuracy, e.g. a typical root-cause-detection could be displayed to the user as "external heat source detected on the left side of the measurement machine, potentially causing out of tolerance measurements by x μm." Such a prediction of the thermal compensation robustness under various heat source types and locations can go hand in hand with a simulation-based sensitivity analysis. Overall, an indication of how to modify a mechanical device may be provided to a user to improve the mechanical process provided by the mechanical device.

Some aspects of the invention may be illustrated by referring to a Coordinate Measuring Machine (CMM) providing a mechanical process. A CMM may be equipped with a probe head, an indexable wrist enabling a change of the orientation of the touch trigger probe head, a stylus with a certain elongation and a tip. Three stacked linear axes can move relative to each other in Cartesian directions. The mechanical process realized by the CMM may be represented by the measurements carried out on a work piece fixed with respect to the base of the CMM. The CMM may be placed near to other machines and may therefore operate under harsh environmental conditions, wherein the temperature may change over time as well as be dependent on the position in the room (e.g. from 20 to 25° C.). Such environmental conditions as well as internal heat sources within the machine due the execution of the measurement process, specifically due to the heating of the motor and/or due to probe head waste heat, may lead to thermal disturbances in the form of thermal gradients on the structure along the kinematic chain from the base through the linear axes, the indexable wrist as well as the probe head and stylus up to the tip. Such temperature distributions may deform the kinematic system in a systematic way, resulting in a change of position and orientation of the stylus/tip.

To avoid such deformations of the kinematic system, state of the art discloses to construct the CMM with materials characterized by a negligible amount of thermal expansion. Typical materials meeting this requirement are Zerodur or Invar: both materials, however, are difficult to process and are expensive.

The method and computer program product according to some aspects of the invention can be used to optimize the number and location of thermal and/or mechanical sensors along the kinematic chain to enable the best thermal error compensation performance and to correct errors arising due to thermal disturbances. Some of the thermal sensors might be placed near heat sources on relevant structural elements. Other thermal sensors might be distributed along the linear axes covering relevant thermal gradient information along the kinematic chain.

A digital representation of the mechanical process may be able to predict the thermal error, as it may describe the physical behavior of the system. The representation model may consist of a thermal finite element description followed by a structural finite element description. In a first step the thermal model may be solved to predict the thermal distribution due to the applied constraints or boundary conditions. Based on this thermal distribution, the structural model may be used to predict the final deformation due to the previously determined thermal distribution.

The digital representation may be described in a modular way, wherein sub-systems may be described individually. In a later step the deformations along the sub-systems can be summed up to obtain the final deformation.

The digital representation may be able to predict single deformation degrees of freedom, e.g. three translational and three rotational degrees of freedom at any point along the kinematic structure. Of special interest may be the sub-system interfaces, e.g. the interface between probe head and last linear axis and the three translational deformation displacements of the final tip. To be independent of the stylus length, the thermal deformation displacement and orientation at the probe head interface may be of special interest.

The digital representation of the CMM might be separately matched with reality by means of some artefact measurements under some well-defined thermal load by adaptation of free parameters of the digital representation. Once the matching is good enough the digital representation can be taken for data replication generating a large amount of synthetic data which may be either difficult or expensive to measure in reality or even impossible: it may, for example, be difficult to measure within the whole measuring volume, as separating clearly between different degrees of freedom may be difficult, e.g. the separation between rotational or translational degree of freedom. The synthetic data can be applied to obtain abstract representation functions: for a CMM, the abstract representation function may be given in polynomial form. The abstract representation function obtained through the computer program product can be implemented on the control system which controls the mechanical process. Measurement data before applying the thermal compensation can be fed to the abstract representation function, wherein the output of the abstract representation function may be the deformation estimation at the above mentioned interface or directly at the tip. This deformation estimation combined with the absolute data can be fed back to the client program which stores the end-results of the mechanical process. At a customer's site, potentially using additional environmental sensors, environmental situations can be identified which are not covered yet within the synthetic data. This information can be fed to the customer and/or used to generate additional synthetic data covering the environment at the customer's site.

BRIEF DESCRIPTION OF THE DRAWINGS

The inventive system is described below in more detail purely by way of example with the aid of concrete exemplary embodiments illustrated schematically in the drawings, further advantages of the invention also being examined Identical elements are labelled with the same reference numerals in the figures. In detail.

DETAILED DESCRIPTION

Figure 1:
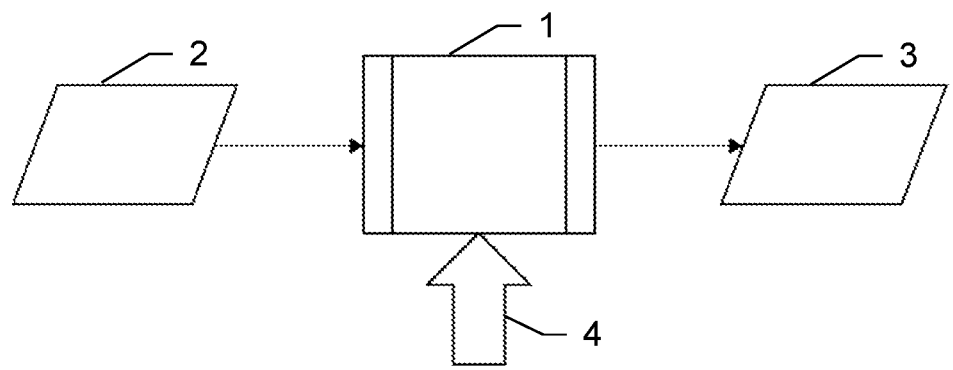
FIG. 1 shows a schematic and illustrative depiction of a mechanical process and its input and output as well as thermally induced disturbances.

FIG. 1 shows a schematic and illustrative depiction of a mechanical process and its input and output as well as thermally induced disturbances. A mechanical process 1, the mechanical process realized by a mechanical device such as a coordinate measuring machine, a tooling machine or an articulated robot arm, is controlled through some control input 2. The controlled execution of the mechanical process 1 provides a mechanical process output 3. An example of such a mechanical process output 3 is the coordinate information provided by a coordinate measuring machine. The mechanical process 1 may be disturbed in its execution by externally or internally arising thermal disturbances 4. Internally arising thermal disturbances may be caused by internal heat sources such as motors, actuators or sensors, in particular if they have usage-specific characteristics, or friction losses in the mechanical device, for example, while external disturbances may be caused by environmental effects such as changing temperature gradients in the near surroundings of the mechanical device, for example.

Changing temperatures and temperature gradients may lead to contractions and/or expansions in the mechanical device and therefore to strain, impairing the quality of the mechanical process output 3. As long as all major thermal disturbances 4 affecting the mechanical process 1 are accounted for, and as long as a precise enough model of the mechanical process 1 is known, the mechanical process 4 may be simulated. The result of such a simulation may help to precisely quantify the impact of the thermal disturbances 4 on the mechanical process output 3.

Knowing thermally induced effects in the mechanical process output 3, such information could then either be used for numerically correcting the mechanical process output 3 or to actively change the mechanical process 1 itself in order to mitigate the effects induced by the thermal disturbances 4, or the known thermally induced effects could be used for designing a different control input controlling the execution of the mechanical process 1, wherein the different control input could be designed so as to reduce thermally induced effects in the mechanical process output 3, wherein control input adaption may proceed in a feedback loop. The first option, numerical correction, may be applicable for mechanical processes realizing measurements, wherein for a coordinate measuring machine with a tactile probing system as the end effector sensing element, for example, the actual position of the probe tip under thermal disturbances of the measurement trajectory may be simulated. The simulated probe tip position may then be used for correcting the nominal probe tip position values at which measurements were made. The second option, actively changing the mechanical process 1 itself, may be applicable for mechanical processes 1 producing actual goods. In this case, it may not be sufficient to know the size of thermally induced errors in the mechanical process output 3. Rather it may be desirable to make such errors as small as possible. A reduction in error may proceed by modifying the mechanical process, for example by adding additional heat sources, attenuating existing heat sources affecting the mechanical process or by specific insulating of certain components. Thermal errors may also be avoided by only starting to use a mechanical device once major transient effects have disappeared and the machine operates in a quasi-stationary state. In both cases, a variable may be provided by the simulation of the mechanical process 1 which indicates the extent of thermally induced errors. For numerically correcting the probe tip position of a coordinate measuring machine, for example, this variable may correspond to a six-dimensional vector describing both a three-dimensional translation as well as a three-dimensional rotation of the probing system in space with respect to the base where the work piece is mounted. Alternatively, it may correspond to a difference vector indicating the distance of the actual probe tip position to the nominal values. For a machine tool and corresponding tool end point, this variable may correspond to parameters parametrizing a 2D surface or line, for example, in case some surface object is to be manufactured or two objects are to be welded together, for example. Using this variable, the mechanical process 1 may then be changed until the parameters of the variable are close enough to desired nominal values.

A simulation of the mechanical process 1 to account for the effects induced by thermal disturbances 4 is in general computationally demanding. Additionally, thermal disturbances may change quickly, implying that on-the-fly simulation may often be required. As variables provided by the simulation used for numerically correcting the measurement process output 3 and variables used for actively changing the measurement process 1 summarize the results of the simulation, it may be beneficial to attempt to learn a direct mapping providing this variable, wherein such a direct mapping may be based on data provided by sensors attached to the mechanical device and/or positioned in the surroundings of the mechanical device, the sensors recording the execution of the mechanical process 1. The direct mapping may be computationally less demanding than the simulation, for it only needs to provide a reduced amount of information as compared to the simulation.

Figure 2:
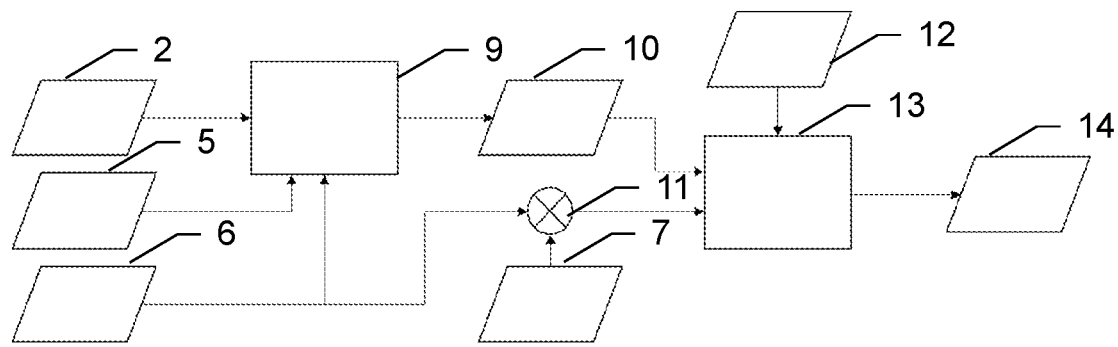
FIG. 2 shows a schematic and illustrative depiction of the computer program product according to the invention in training mode.

FIG. 2 shows a schematic and illustrative depiction of the computer program product according to the invention in training mode. The aim of the training mode is to learn a thermal error compensation function mapping from data provided by sensors, the sensors attached to or integrated into the mechanical device or positioned in its vicinity, to thermal error compensation data, also termed thermal error compensation states. The thermal error compensation data encode information which can be used to compensate effects arising from thermal disturbances 4 influencing the mechanical process 1. Since the thermal error compensation function which is to be learned in training mode may in general depend on the number/type/positioning of the sensors and the type and number of thermal error compensation data which should be provided by the thermal error compensation function, multiple possible thermal error compensation functions providing thermal error compensation data may be associated to one mechanical process 1.

In the training mode, a model 9 of the mechanical process may be known. The model 9 of the mechanical process may describe a dynamical system. To obtain a model 9 fitting reality closely, the model 9 may be iteratively adapted to conform to empirically estimated sensor data. It may be embodied in the form of a finite element model, or in the form of a multibody simulation, with separate models for the subcomponents of the multibody model. The model 9 of the mechanical process may be used to generate data synthetically, the synthetic data being usable for learning the thermal error compensation function. The model may be constrained by further constraints and boundary conditions 5, the constraints and boundary conditions 5 reflecting specific conditions limiting the possible ways in which the mechanical process 1 may be executed. Data-generated constraints may also be derivable from empirically obtained data 6, the empirically obtained data 6 being provided by sensors attached to or integrated into the mechanical device or positioned in its vicinity, wherein the readings of the sensors corresponding to one execution of the mechanical process 1 are grouped together into an object termed sensor input data point. The mechanical process 1 may then be simulated, the simulation constrainable by the control input 2, the constraints and boundary conditions 5 and the data-generated constraints.

A sensor input data point may be obtained from sensors recording a mechanical process 1. The same sensors as used for recording the actual mechanical process 1 may be inserted into the simulated mechanical process, thereby generating a synthetic sensor input data point. Corresponding to a synthetic sensor input data point are synthetic thermal error compensation data indicating the extent of thermally induced errors, the synthetic thermal error compensation data obtainable through a comparison of the simulation result to the nominal results according to the control input 2 without thermal disturbances. The combination of a synthetic input data point and synthetic thermal error compensation data forms the basic building block for a synthetic training data set 10 which may be provided as output by the constrained simulation using the model of the mechanical process. A plurality of such combinations corresponding to different executions of the mechanical process forms the synthetic training data set 10. Empirically obtained thermal error compensation data 7 may be additionally provided to the computer program product, the thermal error compensation data 7 corresponding to sensor input data points. The combination 11 of sensor input data points and thermal error compensation data 7 forms the empirical training data set. Empirical thermal error compensation data 7 may be obtained via calibration measurements performed on known artefacts in controlled environments.

Each sensor recording a mechanical process 1 may provide a sequence of values, wherein the sequence of values may comprise one element or a plurality of elements, wherein the number of elements and the times at which the sensor records its observable may be different from sensor to sensor. The empirically obtained thermal error compensation data corresponding to a sensor input data point may also be provided in the form of a sequence of values, wherein the sequence may comprise one element or a plurality of elements. The sequence elements may be provided at different times as compared to the times at which the sensors recorded their observables. As the underlying mechanical process 1 may be time-dependent, for example due to different thermal inertias within the system and due to time-dependent processing forces and heat loads within the mechanical process 1 as well as due to changing environmental conditions, a thermal error compensation function may be time-dependent as well, for the mapping from a sensor input data point onto thermal error compensation data may depend on the times at which the sensors recorded their observables and on the time at which thermal error compensation data are to be provided by the thermal error compensation function. In case thermal error compensation data are only to be provided at fixed times, for example at regularly sampled timestamps, an explicit dependence of the thermal error compensation function on time may be avoided. In case of irregular sensor readings in time, relative time between sensor readings may influence the thermal error compensation function. If all sensor readings were provided equidistantly in time, the explicit dependence on relative time in the thermal error compensation function could be avoided as well. To further eliminate dependence of the thermal error compensation function on time, the sensor input data point may comprise information about an initial state of the mechanical process 1 at an initial state time, wherein the sensors may only start recording their observables at the initial state time. The encoded knowledge about an initial state of the mechanical process 1 which may be provided by the sensor input data point may make the thermal error compensation function agnostic to the temporal aspects of the mechanical process 1 occurring before the initial state time. The sensor input data point may additionally comprise nominal information, the nominal information corresponding to some quantity of interest in the mechanical process 1 which may be difficult to observe via sensors or which may be very stable and insensitive to thermal disturbances 4, implying that an observation via sensors of said quantity may not be required.

Using the empirical training data set 11 and/or the synthetic training data set 10, the computer program product may then learn a thermal error compensation function mapping from an empirical/synthetic sensor input data point to the corresponding empirical/synthetic thermal error compensation data.

A multitude of possible thermal error compensation functions may be in principle feasible. The computer program product may attempt to identify a suitable thermal error compensation function 14 among candidate thermal error compensation functions 13. The candidate thermal error compensation functions, also termed abstract representation, may be parametrized, the computer program product then attempting to find suitable parameter values. To find suitable parameter values, any global or local optimization algorithm may be used, for example a gradient descent scheme. The abstract representation is searched by the optimization algorithm, wherein the search may commence with a first candidate thermal error compensation function, also termed representation input function 12, wherein the representation input function 12 may be hard-coded into the computer program product or provided as input to the computer program product.

The abstract representation is preferentially rich enough so as to contain at least one value assignment so that the resulting thermal error compensation function may be sufficiently close to the true but unknown thermal error compensation function, wherein the true but unknown thermal error compensation function may depend on the mechanical process 1, the number/type/positioning of the sensors recording from the mechanical process 1, and the nature of the thermal error compensation data to be provided. Possible models for the abstract representation may be neural networks, wherein the output layer of the neural networks may comprise at least n units, wherein n corresponds to the dimension of the thermal error compensation data. The neural network may process a sensor input data point sequentially, or autoregressively, or it might have a finite temporal horizon, processing chunks of the sensor input data point in batches, or it may process the entire sensor input data point at once, effectively providing a sequence-to-sequence mapping. The neural network may be embodied as a recurrent neural network, or as a convolutional neural network, or as a feedforward neural network. The neural network may be trained with mean square loss, or any other loss function providing regression functionality to the learned thermal error compensation function, also termed adapted representation input function 14. Any other known machine learning model family besides neural networks may be used as well, as long as the model families are trainable in a regressive manner. Choosing the representation input function 12 appropriately may accelerate the overall learning process 13. In case a first thermal error compensation function is already learned for a mechanical device operating in some first environment, it may be sensible to assume that the same mechanical device operating in some second environment, the two environments being for example differentiated in their temperature profile, would have a second thermal error compensation function similar to the first thermal error compensation function. Providing the first thermal error compensation function, or parts thereof (such as only individual layers of a neural network), as representation input function to the computer program product, the learning of the second thermal error compensation function might require a smaller amount of training data from the second environment. Such transfer learning may also be beneficial if it were easier to obtain measurements in the first environment (e.g. while calibrating machines initially in a laboratory environment) than in the second environment (in particular at customer site). In a laboratory environment it may also be possible to learn a joint coarse model for thermal error compensation across a large temperature range, for example. At a customer's site, the coarse model may be refined by retraining the coarse model to specifically reflect the conditions present at the customer's site. Transfer learning may also be applied across different mechanical devices, for example in case the sensor input data point has the same dimensions for the different mechanical devices and in case the output dimensions of the thermal error compensation functions are the same for the different mechanical devices. Transfer learning may also be applied in case of different dimensions of the sensor input data points and/or in case of different output dimensions, for example through the use of an embedding operation. In case the thermal error compensation function corresponds to a neural network, the transfer learning may also proceed by taking at least one layer from a trained network and embedding it into a second network.

The computer program product in training mode may be used for optimizing the number/type/positioning of sensors providing measurements of a mechanical process 1. Starting with one or a few sensors, for example, and gradually increasing their number, while at the same time varying their position, for each sensor configuration empirical and/or synthetic training data as well as empirical and/or synthetic validation data may be obtained, wherein the empirical and/or synthetic training data may then be used for learning a thermal error compensation function corresponding to the currently considered sensor configuration in training mode.

Once a sensor configuration is identified which provides a learned thermal error compensation function 14 with an error on the validation data below a pre-defined threshold value, the optimization of the number/type/positioning of sensors may stop. Alternatively, the optimization of the number/type/positioning of sensors may proceed in a different direction, wherein the alternative approach may only utilize synthetic training and validation data. Virtual sensors may be placed in simulation on all or a large number of nodes of the computational mesh used for a finite element simulation of the mechanical process. The results provided by the virtual sensors may then be used for learning a thermal error compensation function. The number of sensors could then be reduced until a last sensor configuration is identified which provides an error on the validation data set below a pre-specified threshold.

The number of parameters of the abstract representation 13 may be preferentially small compared to the number of parameters of the model 9 of the mechanical process, for an abstract representation with a small number of parameters may be less prone to overfitting training data, and learning the parameters of the abstract representation well may require a small amount of training data.

In case the model 9 of the mechanical process is modular, for example in the form of a multibody model, then a physical change in a component of the mechanical device providing the mechanical process may be modularly incorporated into a changed model, wherein other components of the original model 9 may be left unchanged. In such a case it may be possible to only generate synthetic training data for the changed mechanical process.

Figure 3:
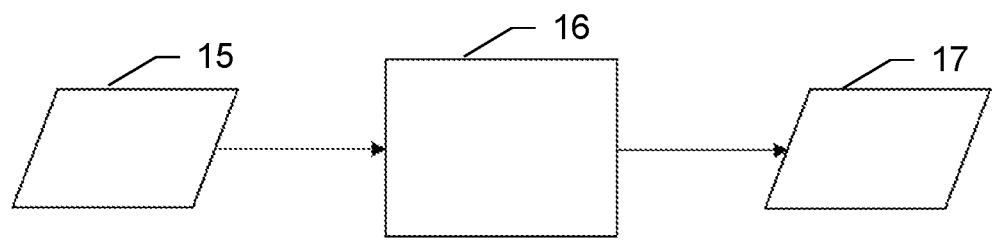
FIG. 3 shows a schematic and illustrative depiction of the computer program product according to the invention in inference mode.

FIG. 3 shows a schematic and illustrative depiction of the computer program product according to the invention in inference mode. A thermal error compensation function provided by the computer program product in training mode, also termed adapted representation input function 16, may be used on individual sensor input data points 15, also termed current sensor input data point, in inference mode providing thermal error compensation data 17, also termed current thermal error compensation state.

For effectively learning an appropriate thermal error compensation function 14 in training mode, a large number of empirical and/or synthetic sensor input data points and corresponding empirical and/or synthetic thermal error compensation data may be necessary. Once the training process is over, the learned adapted representation input function 14 may be fixed, subsequently used on a new sensor input data point, the new sensor input data point also termed current sensor input data point. As the thermal error compensation function learned in training mode may be time-dependent, the adapted representation input function 16 may additionally be invoked with the time at which thermal error compensation data are to be calculated as input. In case the thermal error compensation data are to be provided at pre-determined and fixed time instants, no explicit time needs to be provided to the computer program product in inference mode as the time is implicitly provided. The output of the adapted representation input function 17 may then be used for numerically correcting the mechanical process output 3 of the mechanical process 1 from which the new sensor input data point 15 was obtained, or to actively change said mechanical process 1 in order to mitigate the effects induced by thermal disturbances 4 acting on said mechanical process.

To counter gradual changes in the thermal disturbances 4 acting on a mechanical process 1, a thermal error compensation function 14 may need to be re-learned once in a while.

Figure 4:
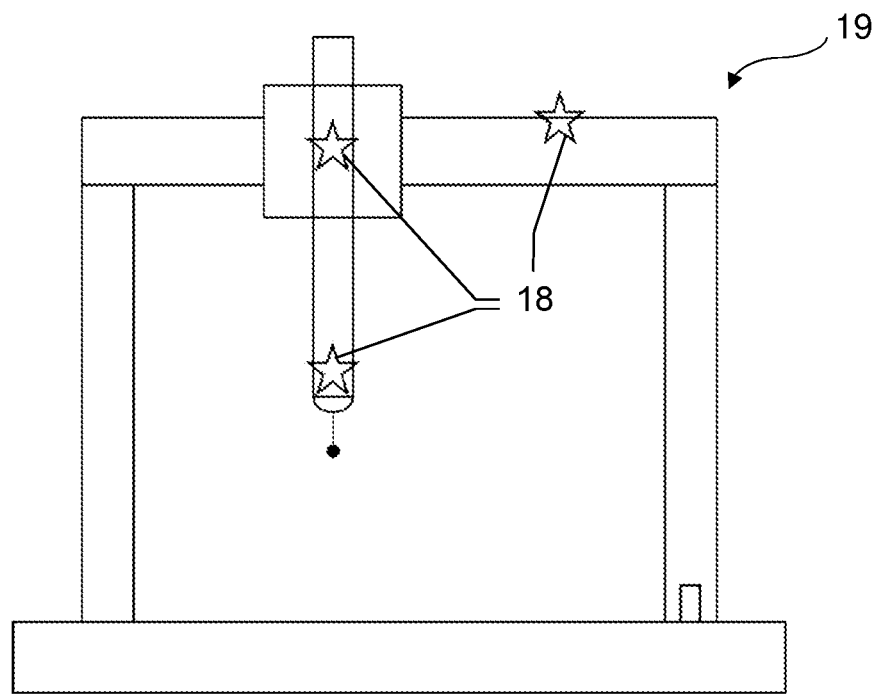
FIG. 4 shows a schematic and illustrative depiction of a Coordinate Measuring Machine (CMM) and of sensors attached to the CMM for providing thermal data needed for thermal error compensation according to the invention.

FIG. 4 shows a schematic and illustrative depiction of a Coordinate Measuring Machine (CMM) 19 and of sensors 18 attached to the CMM for providing thermal data needed for thermal error compensation according to the invention. A suitable number/type/positioning of sensors 18 is initially unknown and may depend both on the machine and the environment it is placed in. The computer program product according to the invention may be used for determining a suitable number/type/positioning of sensors 18. Constraints on the possible positions for sensors 18 may be taken into account.

Figure 5:
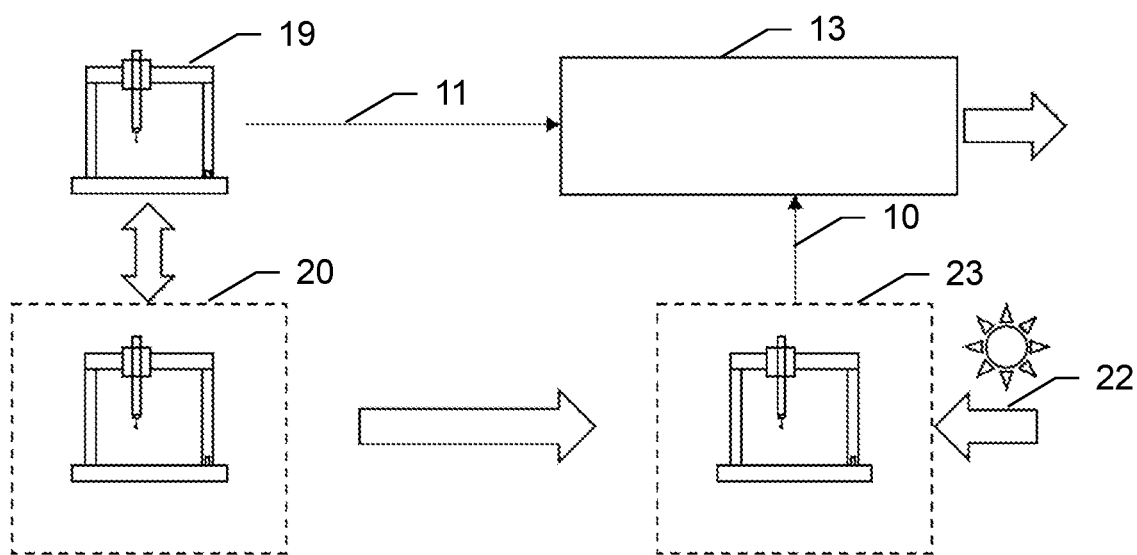
FIG. 5 shows a schematic and illustrative depiction of the invention.

FIG. 5 shows a schematic and illustrative depiction of the information and data flow of the method according to the invention. A mechanical device 19, in FIG. 5 represented by a CMM, possesses a corresponding digital model 20. The digital model 20 may be used to synthetically generate training data 10 for a learning algorithm 13. The synthetically generated training data 10 may be constrained by different influences 22 representing situations that may arise in the real world, for example. The generation 23 of synthetic training data 10 takes such external conditions into account. Using empirically obtained training data 11 and synthetically generated training data 10, a learning algorithm 13 may provide a function which can be used during the operation of the machine 19 to compensate thermal errors affecting the machine 19.

Figure 6:
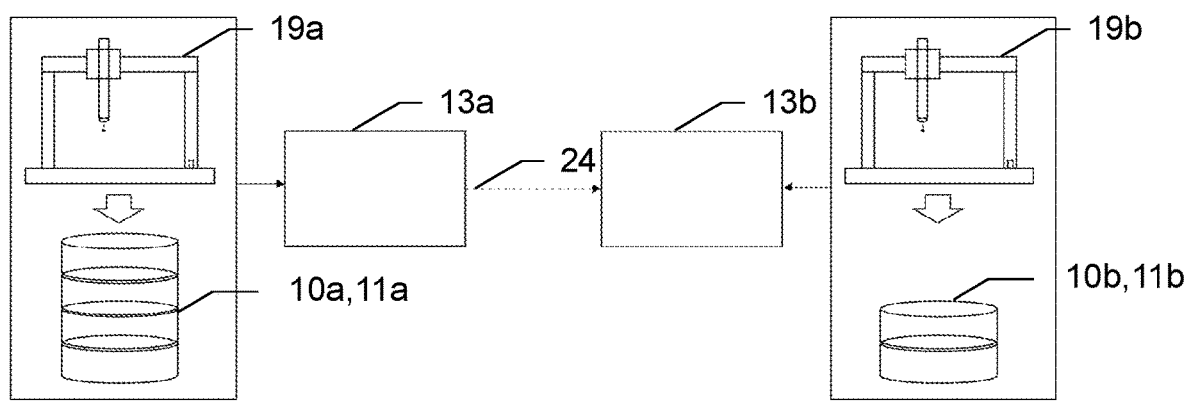
FIG. 6 shows a schematic and illustrative depiction of the use of transfer learning according to the invention.

FIG. 6 shows a schematic and illustrative depiction of the possible benefits of the use of transfer learning according to the invention. Two machines 19a,19b that are similar enough may operate in two different environments. In FIG. 6, the two machines are embodied as CMMs. Empirically and/or synthetically derived training data 10a, 11a obtained from the first machine 19a may be used by a learning algorithm 13a to obtain a representation for compensating errors arising due to thermal disturbances affecting the first machine 19a. The second machine 19b may operate in a different environment, wherein the different environment influences the behavior of the second machine 19b. To learn 13b a model for thermal error compensation for the second machine 19b, the second learning algorithm 13b may utilize information 24 from the first learning algorithm 13a. Such information transfer 24 may reduce the required amount of empirically and/or synthetically derived training data 10b, 11b required for faithfully learning a thermal error compensation function by the second learning algorithm 13b. The information 24 provided by the first learning algorithm 13a may additionally accelerate the second learning algorithm 13b. Transfer learning may also be used to detect if there is a large difference between the two environments in which the first machine 19a and the second machine 19b operate. In case the thermal error compensation function provided by the second learning algorithm 13b provides a large error on a validation data set associated to the second machine 19b, this information may be provided to a user to indicate that the environmental influences affecting the second machine 19b are significant: such an indication may be particularly relevant if the first environment in which the first machine 19a operates corresponds to a laboratory environment with optimal conditions.

Although the invention is illustrated above, partly with reference to some preferred embodiments, it must be understood that numerous modifications and combinations of different features of the embodiments can be made. All these modifications lie within the scope of the appended claims.

What is claimed is:

1. A computer program product for compensating errors of a mechanical process due to thermal disturbances, the computer program product having a non-transitory machine-readable storage medium that includes computer-executable instructions that when executed by a computer is configured to receive as input:
- a set of sensor input data points from a sensor input data point space, each sensor input data point comprising data from a set of sensors, wherein each sensor provides a sensor sequence of sensor values at sensor sequence times, and each sensor input data point corresponds to an evolution of the mechanical process, wherein different sensor input data points correspond to different evolutions of the mechanical process;
- a current sensor input data point;
- a set of thermal error compensation states of the mechanical process, wherein each thermal error compensation state comprises a thermal error compensation state sequence of thermal error compensation vectors, wherein the thermal error compensation vectors are provided at thermal error compensation state sequence times;
- a model of the mechanical process, the model comprising a set of free parameters and a set of internal parameters, the assignment of free parameters and internal parameters determining temporal and spatial evolution of the model, the free parameters having pre-assigned values, wherein the free parameters are parameters that are determined through a calibration step;
- constraints on the temporal and spatial evolution of the model in the form of possible sets of values which the free parameters can take and in the form of sets of relationships between the internal parameters of the model;
- an abstract representation embodied as a function mapping an input space onto the space of thermal error compensation states, wherein the input space comprises at least the sensor input data point space, the function having a set of function parameters; and
- a representation input function with assigned function parameter values, the representation input function corresponding in form to the abstract representation, wherein the computer program product possesses two modes of operation, wherein in a training mode a training data set comprising empirical training data or synthetic training data is used, wherein the empirical training data are comprised of the set of sensor input data points as empirical training data input and the set of thermal error compensation states as empirical training data output, and wherein the synthetic training data are constructed by way of simulations carried out using the model of the mechanical process and the constraints, the synthetic training data comprising a synthetic simulated set of sensor input data points as synthetic training data input and a synthetic simulated set of thermal error compensation states as synthetic training data output, wherein the training data set comprising the empirical or synthetic training data is used for adapting the representation input function by adapting the function parameters, an inference mode being configured to use the adapted representation input function, wherein the adapted representation input function is invoked with at least the current sensor input data point to calculate a current thermal error compensation state used for compensating the thermal errors arising during the execution of the mechanical process.

2. The computer program product according to claim 1, wherein at least one sensor input data point of the set of sensor input data points comprises initial state information about the corresponding mechanical process at an initial state time, and/or at least one sensor input data point of the set of sensor input data points comprises nominal information used for controlling the mechanical process, or the current sensor input data point comprises current thermal error compensation state sequence times, wherein the current thermal error compensation state provided by the adapted representation input function is provided at the current thermal error compensation state sequence times.

3. The computer program product according to claim 1, wherein the sensor sequences of sensor values used as input to the abstract representation are aligned in time, wherein corresponding sensor sequence values of a first and a second sensor sequence are obtained at the same time during the evolution of the mechanical process, the set of times at which sensor sequence values are provided being regularly sampled or event-based and/or user-triggered, and the thermal error compensation state sequence times are aligned with the sensor sequence times.

4. The computer program product according to claim 1, wherein the number of function parameters of the abstract representation is smaller than the number of free parameters and internal parameters of the model of the mechanical process.

5. The computer program product according to claim 1, wherein the set of thermal error compensation states provided as input to the computer program product provides information about thermal error compensation only, and the synthetic simulated set of thermal error compensation states is configured to provide information about thermal error compensation only, wherein compensations for other disturbances affecting the mechanical process are substantially separable from thermal error compensation.

6. The computer program product according to claim 1, wherein the constraints provided to the computer program product reflect specific requirements and boundary conditions, the constraints limiting the space of possible evolutions of the mechanical process, wherein the constraints are reflected in the synthetic training data, the synthetic training data generated according to the constraints, the model of the mechanical process and a set of data-generated constraints, wherein the data-generated constraints are derived from the set of sensor input data points.

7. The computer program product according to claim 1, wherein the number of generated synthetic training data is larger than the number of function parameters of the abstract representation, wherein the synthetic training data comprise examples for evolutions of the mechanical process compatible with the constraints, the number of synthetic training data per nominal evolution compatible with a constraint being related to the expected frequency of occurrence of said nominal evolution of the mechanical process, and the training data set is only comprised of synthetic training data.

8. The computer program product according to claim 1, wherein a fixed number of sensor sequence elements is considered by the abstract representation, wherein the fixed number is the same for all sensors providing information to the computer program product, wherein the abstract representation is configured to weight the sensor sequence elements in case of temporal irregularity, temporal irregularity understood with respect to the sensor sequence times at which the sensor sequence elements were obtained, the weighting pattern taking the irregularity of the input to the abstract representation into account.

9. The computer program product according to claim 1, wherein the abstract representation is embodied as a recurrent neural network, or as a convolutional neural network, or as a feedforward neural network, or as ridge regression, or as a feedforward neural network, or as polynomial of fixed degree or as an algebraic expression or elementary function, or the model of the mechanical process is given in the form of a finite element method, or by a combination of a numerical model with symbolic equations.

10. The method for providing indication about the physical sources of thermal errors in a mechanical process using the computer program product according to claim 1, further comprising applying an attribution method to the adapted representation input function, wherein the attribution method provides information about input features to the adapted representation input function which have an important influence on the output of the adapted representation input function, and using the identified important input features to provide an indication about the physical sources associated to the identified important input features.

11. A method for compensating thermal errors in a mechanical process, the method comprising:
using a set of sets of sensor input data points, each sensor input data point from a set of sensor input data points configured to provide information about an evolution of the mechanical process, wherein each set of sensor input data points corresponds to a set of sensors, each sensor providing sensor values in the form of a sensor sequence output at sensor sequence times, the sensor sequence outputs corresponding to a set of sensors comprised in the sensor input data point in a corresponding sensor input data point space;
using a set of sets of thermal error compensation states of the mechanical process, wherein each thermal error compensation state comprises a thermal error compensation state sequence of thermal error compensation vectors, wherein the thermal error compensation vectors are provided at thermal error compensation state sequence times, each set of thermal error compensation states corresponding to a set of sensor input data points from a corresponding sensor input data point space;
using a set of abstract representations, each abstract representation mapping from a space comprising at least a sensor input data point space onto a space comprising at least the corresponding space of thermal error compensation states, wherein the corresponding space of thermal error compensation states is the space comprising the set of thermal error compensation states corresponding to the set of sensor input data, wherein each abstract representation function has a set of function parameters,
receiving a current sensor input data point;
generating a model of the mechanical process, the model comprising a set of free parameters and a set of internal parameters, the assignment of free parameters and internal parameters determining temporal and spatial evolution of the model, the free parameters having pre-assigned values, wherein the free parameters are parameters that are determined through a calibration step, and
applying constraints on the temporal and spatial evolution of the model in the form of possible sets of values of the free parameters and in the form of sets of relationships between the internal parameters of the model,
wherein a computer program product is invoked in the training mode with:
a set of sensor input data points from the set of sets of sensor input data points, each sensor input data point providing information about an evolution of the mechanical process, and the corresponding set of thermal error compensation states from the set of sets of thermal error compensation states,
an abstract representation from the set of abstract representations,
a representation input function with assigned function parameter values, the representation input function corresponding in form to the abstract representation, the model of the mechanical process, and
the constraints
as input, the computer program product providing an adapted representation input function for thermal error compensation, and the adapted representation input function is invoked in the inference mode with at least the current sensor input data point as input, wherein the computer program product provides a thermal error compensation state.

12. The method for compensating thermal errors in a mechanical process according to claim 11, wherein the set of sensor input data points from the set of sets of sensor input data points, the corresponding set of thermal error compensation states and the abstract representation from the set of abstract representations are chosen by a selection routine, wherein the selection routine iterates over the set of sets of sensor input data points and the set of abstract representations, invoking the computer program product in training mode with a subset of the currently considered set of sensor input data points, the corresponding subset of the corresponding set of thermal error compensation states, the currently considered abstract representation, the model of the mechanical process and the constraints, the iteration proceeding until a set of sensor input data points is found in combination with an adapted representation input function, the set of sensor input data points corresponding to a set of sensors, which provides a thermal error compensation state deviating by less than a provided threshold from the true thermal error compensation state, wherein the latter evaluation is carried out on the relative complement of the subset of the set of sensor input data points in the set of sensor input data points and the corresponding relative complement of the subset of the set of thermal error compensation states in the set of thermal error compensation states, the subsets used as input to the computer program product, wherein the relative complements form a validation data set.

13. The method for compensating thermal errors in a mechanical process according to claim 12, wherein the set of sets of sensor input data points is ordered according a complexity metric, wherein the ordering of the sets of sensor input data points proceeds according to the number of sensors corresponding to a set of sensor input data points, wherein the ordering proceeds in an increasing fashion, and the iteration over the set of sets of sensor input data points starts with a first set of sensor input data points and proceeds from there to sets of sensor input data points ordered above the first set according to the complexity metric.

14. The method for compensating thermal errors in a mechanical process according to claim 13, wherein the set of sets of sensor input data points comprises sets of sensor input data points corresponding to sets of sensors positioned at a finite number of places, the places being specified according to construction principles of the mechanical device providing the mechanical process and external influences on the mechanical process, and the cardinality of the set of sets of sensor input data points is finite.

15. The method for compensating thermal errors in a mechanical process according to claim 11, wherein the representation input function provided to the computer program product as input in the training mode encodes thermal error compensation information relating to a different mechanical process.

\* \* \* \* \*